United States Patent

[11] 3,550,662

| [72] | Inventors | Adam Robert Remke;<br>Anna Remke, Chicago, Ill. |
|---|---|---|
| [21] | Appl. No. | 748,363 |
| [22] | Filed | July 29, 1968 |
| [45] | Patented | Dec. 29, 1970 |
| [73] | Assignee | Remke Company<br>Chicago, Ill.<br>a corporation of Illinois |

[54] SIDE-LACED FLAT-BOTTOM DRAWSTRING BAG FOR TREE AND SHRUB BALLING
6 Claims, 9 Drawing Figs.

[52] U.S. Cl................................................... 150/11,
150/1; 47/37
[51] Int. Cl.................................................... B65d 33/28
[50] Field of Search............................................ 150/1, 11;
47/37; 229/63

[56] References Cited
UNITED STATES PATENTS

| 513,323 | 1/1894 | Hill.............................. | 150/1 |
| 2,186,384 | 1/1940 | Lester......................... | 150/11 |
| 2,253,688 | 8/1941 | Collins........................ | 150/11X |
| 2,600,300 | 6/1952 | Katz............................ | 150/1X |
| 2,678,672 | 5/1954 | Spilman....................... | 150/11 |
| 2,713,370 | 7/1955 | Quinn.......................... | 150/11 |
| 2,897,863 | 8/1959 | Somers........................ | 150/1 |

FOREIGN PATENTS

| 198,150 | 8/1965 | Sweden........................ | 150/11 |

Primary Examiner—Donald F. Norton
Attorney—Hill, Sherman, Meroni, Gross & Simpson ABSTRACT: A flat-bottomed bag having a drawstring side and top closure comprises a single piece of burlap material in a generally rectangular form having opposite straight, generally parallel, end edges, a straight top edge and a serrated bottom edge. The woof and warp of the material are parallel to or perpendicular to the straight edges of the sides and top. The edges of the serrations are joined securely to form a generally rectangular bottom for the bag. The free opposite end edges are overlapped upon each other and have aligned holes which receive a drawstring therethrough. Similarly row of holes parallel to the top edge may receive the continuation of the drawstring interlaced therethrough so that when the drawstring is pulled the overlapping side portions and the top may be drawn together by the drawstring.

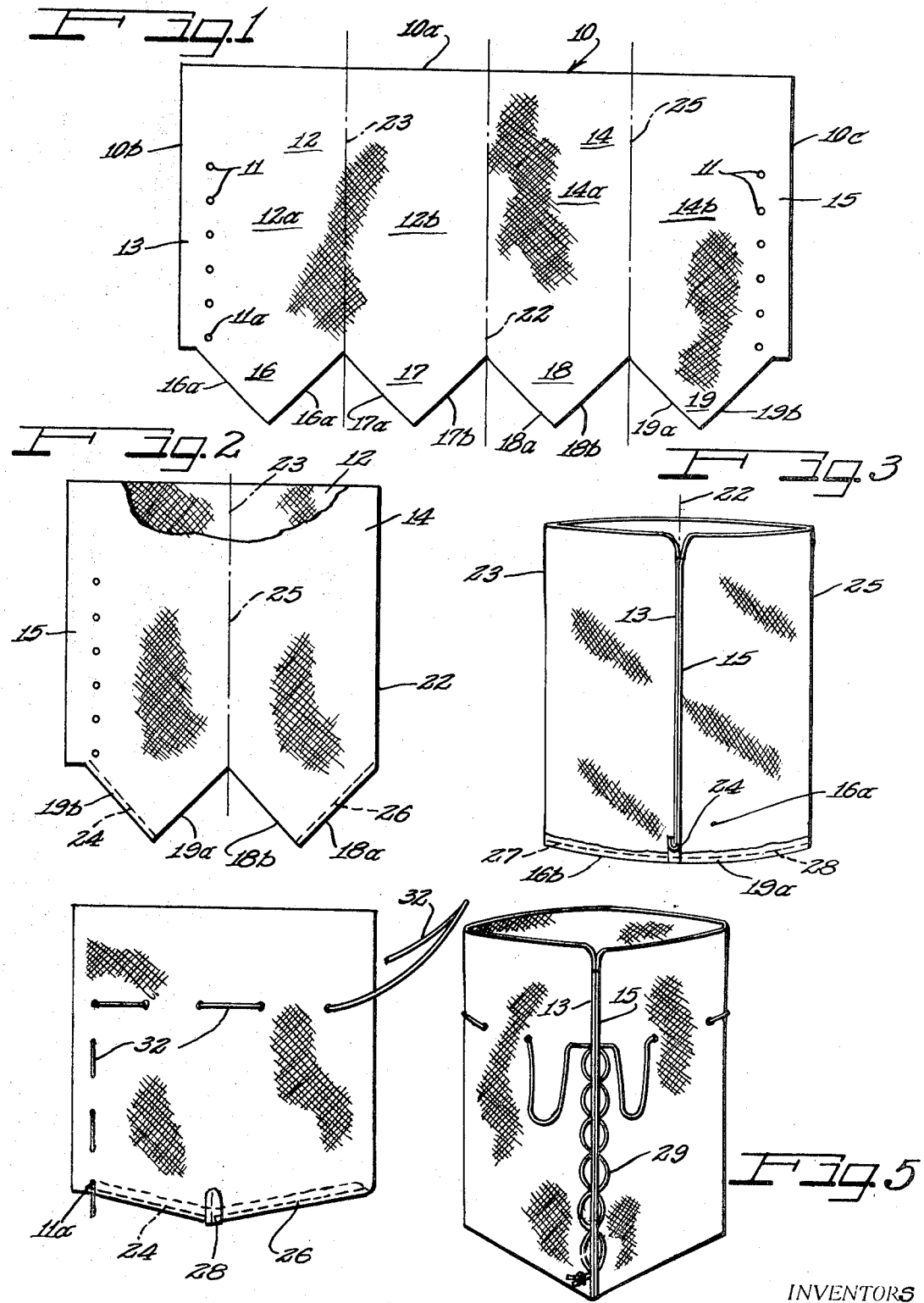

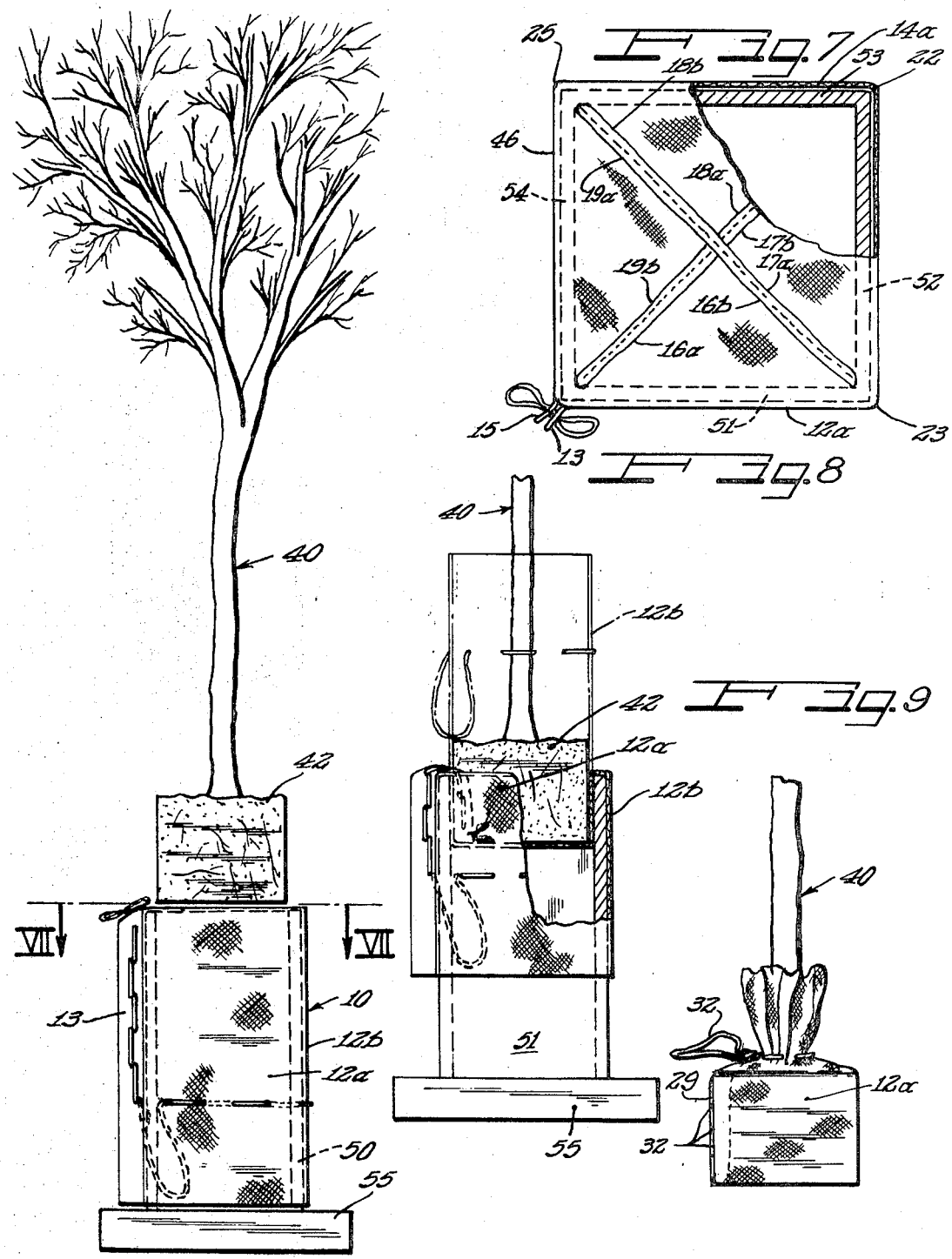

3,550,662

SIDE-LACED FLAT-BOTTOM DRAWSTRING BAG FOR TREE AND SHRUB BALLING

BACKGROUND OF THE INVENTION

1. Field of the Invention

This invention generally relates to a bag construction, the method of making the bag and the method of using the bag in transplanting trees or shrubs. More particularly it includes a rectangular flat-bottom bag having a drawstring laced through one side and around the top thereby permitting quick and convenient application of the bag to the "ball" of a tree of plant. The bag is made of a single piece of material cut to facilitate rapid joining of the material edges in two operations during formation of a bottom portion of the bag. Use of the bag with a form guide means allows ready application to the "ball."

2. Description of the Prior Art

It is common in the transplanting of trees and plants to use a single square handkerchieflike piece of material to cover the "ball" and to apply this material to the ball by placing the ball in the center of the material and bringing the edges of the material up around the trunk or stem and securing it thereto with a string. Sometimes pinning nails are used as an additional means of securing the material to the "ball." These nails may be used to pin the material to itself in a diaperlike fashion or may be driven through the material into the "ball" to hold the material in place on the "ball."

Where bags are used in the prior art they are made of a material identified as stretch burlap or tubular burlap made from tubular material or stretch burlap. This means that these bags are formed from strips of burlap which are bias cut and spiral sewn or spiral woven. With these conventional types of bags the warp and woof is bias cut and consequently there is a tendency for the bag to easily stretch and lose the original predetermined form when it is loaded with a ball. With regard to the predetermined form of the ball and bag, it is noted that the prior art of which we are aware fails to recognize the concept of forming the balls of regular and consistently-shaped standard configurations which are graduated so that a small number of standard sizes and shapes will accommodate a very wide range of trees and plants. Another disadvantage of the prior art structures is that the balls when bagged have irregular-shaped bottoms. Thus they have no flat bottom and present storage and display problems.

SUMMARY OF THE INVENTION

The bag construction of the present invention and the manner in which it is made and the method by which it is applied to the predetermined "ball" configuration of a tree or plant overcomes the problems and disadvantages associated with the prior art.

Thus, providing a small number of standard sized bags allows the advantages of form maintaining fit of the bags to the ball while keeping bag inventory and production costs to a very minimum. Standardizing the predetermined configurations for both the "ball" and the bag greatly facilitates handling, storage and display of the plants or trees. Providing a flat-bottomed ball and a bag which will retain this advantageous configuration also has many advantages in handling, storage and display of the trees. It is to be understood in the context of this disclosure that the term "ball" refers to the soil and roots of a plant, tree or similar thing which is dug up when the thing is to be removed from the surrounding soil. It need not be of a sphericallike shape, but may be of any convenient configuration.

Our side-laced flat-bottom drawstring bag for trees and shrubs may have a square bottom and four upstanding generally right angularly related intersecting sides. These sides are joined or integral along three of the corners and have overlapping portions or abutting portions along the length of the fourth corner. In practice, these portions may overlap about 1½ inches and have a plurality of holes spaced therealong about 2 to 6 inches apart. A drawstring is laced through both overlapping portions to provide a means for rapidly securing this fourth corner. The same drawstring or another drawstring is interlaced around the top of the bag at a distance below the top edge so that where the side and top drawstrings are the same a single pull or tensioning of the drawstring will secure the bag to the ball. Where the material forming the bag is burlap it is an important feature of our invention that the burlap be oriented so that its woof and warp be parallel and perpendicular to the corners or intersections.

The method of making the bag structure includes the steps of forming a flat piece of burlap material in a generally rectangular configuration having a straight top edge, two straight side edges and a serrated bottom edge. The serrations comprise a plurality of peaks or peaklike structures or flaps. Each of said peaks is defined by intersecting first and second edges. In practice, we have found that four peaks are adequate when the bag is being made of one piece of material. If the bag is of two pieces, each piece may conveniently have two peaks. The next step of making the bag includes arranging the material so that the edges of different peaks are superimposed upon each other and the material is in a generally flat parallel relationship. This may be done by folding a single piece having four peaks in half about a center line or by laying two separate pieces each having two peaks upon each other. Initially the edges of the peaks adjacent to the side edges of the material are joined. The material is then rearranged by drawing the valleys of the peaks apart and joining the unsewn edges of the peaks in a continuous operation to complete the bottom closure. If the bag is made of two pieces the pieces must be joined along one side edge to provide at this stage in the method a four-sided bag having three integral corners and one open corner.

In the next step a drawstring is laced through the overlapping material adjacent the open corner. This lacing is continued around the top of the bag and below the top edge and in one embodiment of the invention the lacing is rethreaded through the corner joint to form a double seam along this corner. In order to firmly secure the lacing in place the ends of the lacing are tied at the point where the lacing initially commenced at the bag bottom. The bag is then ready for use. This bag has the advantages in that it is simple and economical to fabricate while providing a maximum of strength and utility.

In applying the bag to the ball, a form guide can be used and initially the bag is placed over the form guide in an inside out inverted condition whereby the bottom seams are positioned at the top side of the bag. Thereafter, the balled shrub or tree is lowered or rolled into the form guide thereby causing the bag to be inverted around the ball of the shrub or tree. Removal of the bag from the guide is easily accomplished by pulling up on the sides. At this point, the operator can manually grasp and draw the loops of the lacing upwardly thereby causing the lacing to be drawn tight around the sides of the bag and around the top to close the top. A simple knotting firmly secures the bag to the ball. No pinning nails are required and the application is quick, easy and foolproof. The side seams of the bag are left flexible so that the ball can more readily be guided into the bag and so that the bag can be more readily fitted to the predetermined sides of the ball. An important advantage of this construction is that the pull of the lacing and the tension in the bag material is directed along lines coinciding with the woof and warp of the bag burlap material. Thus, the bag maintains its shape and retains the ball in its predetermined configuration.

BRIEF DESCRIPTION OF THE DRAWINGS

FIG. 1 is a view showing the configuration of a single piece of material from which a bag will be made;

FIG. 2 is a view showing the piece of material of FIG. 1 folded upon itself along a center line and having the bottom edges joined;

FIG. 3 is a view of the material of FIG. 2 rearranged to allow the joining of the remaining bottom edges;

FIG. 4 is an elevational view on the bag showing the initial lacing step;

FIG. 5 is a perspective view of the bag showing the completed lacing of the drawstring;

FIG. 6 is an elevational view showing the bag in its inverted inside out condition in place over a form guide with a ball in place ready to be bagged;

FIG. 7 is a view taken along the line VI-VI with parts in cross section;

FIG. 8 is an elevational cross-sectional view showing the bag being lowered in the form guide during the application of the bag to the ball (removal of the bag with the ball is shown in dotted lines); and, FIG. 9 is an elevational view showing the completed application of the bag to a ball.

DESCRIPTION OF THE PREFERRED EMBODIMENT

A piece of material 10 is shown in FIG. 1 having a top edge 10a, side edges 10b, 10c and a serrated bottom including first, second, third and fourth peaks 16, 17, 18 and 19, respectively. Each of the peaks is defined by intersecting first and second edges having the suffixes of a and b respectively. Thus peak 16 is bounded by edges 16a and 16b while peak 17 is bounded by edges 17a and 17b, etc. The piece 10 is divided, for purposes of illustration, by a fold line 22 into identical portions 12 and 14. The portion 12 in turn is divided by a bend or fold line 23 into portions 12a and 12b which in this case correspond to the peaks 16 and 17. Likewise, the portion 14 is divided by a fold or bend line 25 into portions 14a and 14b corresponding with peaks 18 and 19 respectively. Each of the portions 12 and 14 includes corresponding holes 11 adjacent to their outer edge. A portion designated by 13 along the edge of portion 12 and a portion 15 along the edge of portion 14 may be provided in the case of some materials to provide extra strength and assurance against the possible pullout of the lacing which will pass through the holes 11.

In the manufacture of our flat-bottom side-laced bag, the material shown in FIG. 1 is folded along the line 22 so that the mirror image edges overlie each other. Thus, by way of illustration edge 18a will overlie edge 17b; edge 18b will overlie edge 17a; edge 19a will overlie edge 16b; and edge 19b will overlie edge 16a. Since only the edges of the peaks will be joined at this point in the manufacture, it is not necessary that the edges 10b and 10c or the portions 13 and 15, or the top edges 10a necessarily overlie each other. With the material in position as shown in FIG. 2 a joint is effected between edges 19b and 16a and between edges 18a and 17b. The generic terms "joint" or "joining" are used to designate any suitable means for joining the particular materials used. In practice when the material 10 is burlap the joint will be effected by sewing or stitching. For purposes of illustration, the joints are shown as stitching. However, it is to be contemplated that if the material 10 were a plastic film for example, the joining might be done by heat sealing or adhering the edges together. The joint through edge 19b is designated as 24. Likewise, the joining means through portion 18a and 17b is shown at 26.

With the material joined as shown in FIG. 2 it is grasped in the general area designated by 23 and 25 and pulled into substantial conformity with a plane passing through the fold lines 23 and 25 as is shown in FIG. 3. At this point the fold lines 23 and 25 will be as widely separated from each other as is possible and the fold line 22 will be adjacent the intersection of the portions 13 and 15. With the material so arranged it is possible to effect the joining of edge 16b with edge 17a and of edge 19a with edge 18b in one continuous operation. The respective portions of this joint are designated as 27 and 28. This latter operation completes the bottom of the bag. It is thus emphasized that the manufacture of the bag to this substantially completed condition has consisted of a simple material fold operation of a piece of cut material and two substantially straight stitching operations.

As a final step in the manufacture of the bag a twine or cord drawstring 32 is laced through the holes 11 adjacent the portions 13 and 15, and around the top to provide a single closure means for both the fourth corner and the bag top. As is shown in FIG. 4 the lacing may be begun at a lowermost hole 11a and simply interwoven or passed progressively back and forth through the holes so that the lacing alternates between opposite sides of a double thickness of material along the portions 13 and 15 and between the opposite sides of a single thickness of material around the top of the bag. The lacing progresses from the portion 15 around the top of the bag over to the portion 13 where it is again passed through the same holes as before but with the lacing alternating on the opposite sides of the material so that a double stitch joint 29 extending along the fourth corner is formed.

Inasmuch as the lacing spacing and arrangement will vary with the size of the bag, the type of material used in the bag and the particular twine material used, the drawing is merely representative and not to be construed as limiting. We have found polypropylene twine to be an especially satisfactory material for the lacing or drawstring because of its nonstretch characteristics. The holes need not be precut, but the lacing may be accomplished by attaching the twine to a needle and thereafter causing the needle to pierce both layers of the side edges in a back and forth manner continued up the fourth corner of the bag and around the top. In order to firmly secure the lacing in place, the ends of the twine drawstring 32 are tied at the point where the lacing initially commenced at the bag bottom. The bag is then ready for use with form guides or individually. No pinning nails are required with a bag of this type.

As previously mentioned, with conventional types of bags where the warp and woof is bias cut, there is a tendency for the bag to sag or stretch when it is loaded with a ball. With our new construction we have oriented the fibers of the bag to extend parallel to the lines of stress so that in this case for example, they will run vertically and horizontally parallel to the edges 10a, 10b and 10c. This orientation of the woof and warp provides a much stronger bag construction than heretofore known.

The bag shown in FIGS. 1 through 5 is depicted in its inside out condition as it is being manufactured. When the bag 10 is in place on the ball of a plant or tree the seams or joints designated by 24, 26, 27, 28 and 29 will be on the inside of the bag away from outside seam breaking elements and forces. In applying the bag 10 to a ball 42 of a tree 40 as is shown in FIG. 6, the bag 10 is inverted in its inside out condition over a form guide 50. The form guide 50 has a cross-sectional opening generally conforming to the cross-sectional configuration of the ball 42. In FIG. 7 the sides of the form guide may be seen in relation to the bag 10. As shown, the form guide has four sides 51, 52, 53 and 54 supported on a base 55.

With the bag in place on the form guide causing the as shown in FIG. 6, the ball 42 is slowly lowered into the form guide causing the bag to slide into the form guide and around the ball. As the bag 10 slides into the form guide as may be seen in FIG. 8, the sides roll up and over the top edges of the form guide until the ball is surrounded except for the open top side from which the tree or plant stem protrudes. It may be understood that the drawstring joint between the side portions 13 and 15 may open slightly to allow this operation.

After the ball is in the bag the operator can then remove the bagged ball from the form guide in any convenient manner. Thus the sides of the bag may be used to lift it out as is shown by the dotted line in FIG. 8. Alternatively the form guide may be opened or collapsed to remove the ball. At this point, or prior to removal, the operator can grasp and draw the loops of the lacing upwardly to cause the lacing to be drawn tight along the corners of the bag and also along the top of the open end of the bag. With the ends of the lacing knotted near the bottom of the bag as heretofore set out, a single pull on the lacing will secure the joint 29 and draw the top securely around the base of the tree trunk or plant stem to effect a quick and secure application of the bag to the ball. The loops are then knotted together or suitably secured to keep the bag in position. It is also emphasized that at the point where the bag is to be removed from the ball a simple release of the knot or securing means will allow the bag to be quickly removed.

When the peaks in the above-described embodiment are of similar size and shape then the bag will have a square bottom as may be best seen in FIG. 7. It is contemplated by this invention however that other bottom configurations may be desired and in such cases, it is within the scope of this invention to change the relative sizes and shapes of the peaks and the material to accommodate this variation and design. It is also to be understood that this invention is not limited to the use of a single piece of material as is shown in FIG. 1, but in fact a plurality of pieces may be used and joined where appropriate to perform the same function in the same manner as the present invention. It will thus be understood that variations and modifications may be effected without departing from the scope of the novel concepts of this invention.

We claim:

1. A side-laced flat-bottom drawstring bag for a plant ball comprising a plurality of generally rectangular upstanding sides, each of said sides having a top edge and a bottom edge, said bottom edge of each of said sides having a generally triangular peaked portion integral with said sides along one edge of said triangle, said remaining edges of said triangle being bound together to the next adjacent triangular edge whereby said triangular peaked portions form a generally flat bottom generally normal to said upstanding sides, each of said sides having generally parallel side edges, two of said adjacent side edges overlapping each other with the remainder of said side edges being joined together, said overlapping side edges having rows of holes therethrough, said rows of holes being aligned with each other, said sides having a row of holes generally parallel to said top edge and extending about the periphery of said top edges, a single drawstring threaded through said edges so as to permit closing of said side joined and said top edges by pulling on said drawstring.

2. A bag according to claim 1 wherein the material forming the bag is burlap with its woof and warp in the sides oriented parallel and perpendicular to the overlapping free side edges.

3. A bag having a flat bottom and four upstanding generally right angularly related intersecting sides, two of said sides having overlapping side surface portions at their intersection and a drawstring double-laced through said overlapping side portions whereby said portions may be drawn together by said drawstring, said sides each having a top edge and said drawstring being interlaced through each of said sides at a distance below said top edge so that when said drawstring is pulled said overlapping side surface portions are drawn together and said top is closed.

4. A bag according to claim 3 wherein the material forming the bag is burlap with its woof and warp in the sides oriented parallel and perpendicular to the intersections.

5. A one-piece burlap bag having a flat bottom:
said bottom comprising a series of flaps related and sewn together; and
said bag having a vertical side edge joint and an open top,
a laced drawstring extending along said vertical side edge joint of the bag and around the open top so as to permit closing of said side joint and said open top by pulling or applying tension to said drawstring.

6. A bag having a bottom with;
sides upstanding from the bottom to provide an open top;
said sides being closed around the perimeter of the bottom except for an open side joint extending through the length of the sides; and
a single continuous drawstring laced across the open joint and through the sides around the open top at a distance above the bottom so that when the drawstring is tensioned both the side joint and the top will be drawn closed.

UNITED STATES PATENT OFFICE
CERTIFICATE OF CORRECTION

Patent No. 3,550,662          Dated December 29, 1970

Inventor(s) Adam Robert Remke and Anna Remke

It is certified that error appears in the above-identified patent and that said Letters Patent are hereby corrected as shown below:

Column 1, line 19, change "handkerchieflike" to --handkerchief-like-
           line 25, change "diaperlike" to --diaper-like--.

Column 2, line 13, change "peaklike" to --peak-like--;
           line 44, after "inside" insert -- - -- (dash).

Column 3, line 4, after "inside" insert -- - -- (dash);
           line 34, change "pullout" to --pull-out--.

Column 4, line 17, change "nonstretch" to --non-stretch--;
           line 18, change "precut" to --pre-cut--;
           line 50, after "guide" delete "causing the as" and insert Signed and sealed this 24th day of August 1971.

(SEAL)
Attest:

EDWARD M. FLETCHER, JR.          WILLIAM E. SCHUYLER, JR.
Attesting Officer                   Commissioner of Patents